(12) United States Patent
Salloum Salazar et al.

(10) Patent No.: US 6,700,878 B2
(45) Date of Patent: *Mar. 2, 2004

(54) COMMUNICATION NETWORK WITH IMPROVED ACCESS PROTOCOL

(75) Inventors: Antonio E. Salloum Salazar, Padova (IT); Giuseppe Coppola, Monza (IT)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/277,647

(22) Filed: Mar. 26, 1999

(65) Prior Publication Data

US 2003/0072321 A1 Apr. 17, 2003

(30) Foreign Application Priority Data

Mar. 26, 1998 (EP) .............................................. 98200933

(51) Int. Cl.$^7$ ............................................... H04B 7/204
(52) U.S. Cl. ................... 370/329; 370/437; 370/462; 370/468
(58) Field of Search ................................ 370/310, 458, 370/329, 330, 431, 478, 328, 337, 276, 341, 347, 437, 348, 447, 462, 468, 459, 461

(56) References Cited

U.S. PATENT DOCUMENTS

| 4,400,585 | A | * | 8/1983 | Kaman et al. | ............... 455/455 |
| 5,280,630 | A | * | 1/1994 | Wang | ......................... 455/56.1 |
| 5,303,234 | A | * | 4/1994 | Kou | ........................... 370/442 |
| 5,396,539 | A | * | 3/1995 | Slekys et al. | ............. 455/426.1 |
| 5,448,750 | A | * | 9/1995 | Eriksson et al. | ............ 455/33.1 |
| 5,748,624 | A | * | 5/1998 | Kondo | ......................... 370/347 |
| 5,774,805 | A | * | 6/1998 | Zicker | ......................... 455/426 |
| 5,790,551 | A | * | 8/1998 | Chan | ........................... 370/458 |
| 5,805,595 | A | * | 9/1998 | Sharper et al. | .............. 370/442 |
| 5,886,993 | A | * | 3/1999 | Ruszczyk et al. | ............ 370/451 |
| 5,898,928 | A | * | 4/1999 | Karlsson et al. | ............. 455/450 |
| 5,931,964 | A | * | 8/1999 | Beming et al. | .............. 714/748 |
| 5,953,321 | A | * | 9/1999 | Berrada et al. | .............. 370/322 |
| 6,006,092 | A | * | 12/1999 | Ward | .......................... 455/438 |
| 6,047,191 | A | * | 4/2000 | Desgagne | ................... 455/455 |

(List continued on next page.)

FOREIGN PATENT DOCUMENTS

| EP | 0666699 A1 | 8/1995 | ............ H04Q/7/38 |
| WO | WO9633587 | 10/1996 | ............ H04Q/7/38 |
| WO | WO9719525 | 5/1997 | ........... H04B/7/204 |

OTHER PUBLICATIONS

Sanjiv,D.G. Goodman, U. Timor, Performance of PRMA: A Packet Voice Protocol for Cellular Systems, vol. 40, No. 3, Aug. 1991.

*Primary Examiner*—Chi Pham
*Assistant Examiner*—Anh-Vu H Ly

(57) ABSTRACT

A multiple access communication network is disclosed having a primary station that is coupled via a transmission medium to a plurality of secondary stations. The primary station is arranged for determining a free channel list comprising the channels, which are not used by any of the secondary stations to transmit information to the primary station. The primary station transmits this list of free channels to the secondary stations. The secondary stations are arranged for attempting to seize one of the channels indicated on the free channel list. If the attempt to seize a channel was successful, the secondary stations keeps using the channel it seized until it has all available information transmitted. If the secondary station stops using the channel, the primary station will include the channel again in the free channel list.

10 Claims, 5 Drawing Sheets

U.S. PATENT DOCUMENTS

| | | | | |
|---|---|---|---|---|
| 6,052,594 A | * | 4/2000 | Chuang et al. | 455/450 |
| 6,058,108 A | * | 5/2000 | Raith et al. | 370/337 |
| 6,112,080 A | * | 8/2000 | Anderson et al. | 455/422 |
| 6,178,329 B1 | * | 1/2001 | Chao et al. | 455/452 |
| 6,226,279 B1 | * | 5/2001 | Hansson et al. | 370/329 |
| RE37,301 E | * | 7/2001 | Lo | 370/448 |
| 6,275,506 B1 | * | 8/2001 | Fazel et al. | 370/478 |
| 6,310,867 B1 | * | 10/2001 | Tat et al. | 370/330 |
| 6,377,564 B1 | * | 4/2002 | Burdette et al. | 370/337 |
| 6,393,013 B1 | * | 5/2002 | Masui et al. | 370/346 |
| 6,400,698 B1 | * | 6/2002 | Shaheen | 370/329 |

* cited by examiner

COMMUNICATION NETWORK WITH IMPROVED ACCESS PROTOCOL

BACKGROUND OF THE INVENTION

The present invention is related to a communication network comprising a primary station coupled to a plurality of secondary stations via a transmission medium, the secondary stations being arranged for attempting to seize a channel for transmitting information to the primary station.

The present invention also relates to a primary station and a secondary station for use in such a communication network. The invention is also related to a communication method.

A communication network according to the preamble is known from the article "Performance of PRMA: A Packet Voice Protocol for Cellular systems" by S. Nanda, D. Goodman and U. Timor in IEEE Transactions on Vehicular Technology, Vol.40, No.3, August 1991.

Such communication systems are used when a plurality of secondary stations have to transmit information to a primary station over a transmission medium being partly in common for a number of secondary stations. In order to prevent mutual inference between two or more secondary stations transmitting information to a primary station, several techniques as FDMA, TDMA, CDMA and combinations thereof have been developed.

In FDMA (Frequency Division Multiple Access) the channels comprise a plurality of frequency bands, each being able to carry one signal from a secondary terminal. By allocating one of the available frequency bands to a secondary station having data to transmit to the primary station, it becomes possible that a plurality of secondary stations transmit information to the primary station without interfering each other.

In TDMA (Time Division Multiple Access) the time axis is divided into a plurality of time slots, in each of which a different secondary station can transmit information to the primary station.

In CDMA (Code Division Multiple Access) to each of the (active) secondary stations a code is assigned. The secondary station uses this code to modulate the data to be transmitted which in general has a much lower transmission rate than the rate which is used for transmitting the code. The primary station can extract the signal transmitted by a particular secondary station by correlating the received signal with the code assigned to said particular station. The received signals from the different secondary stations are orthogonal, because the codes assigned to the different secondary stations are mutually orthogonal.

It is observed that it also possible to use combinations of the above mentioned multiple access methods. An often used combination is a combination of FDMA and TDMA in which a plurality of frequency bands is available for transmitting information from the secondary stations to the primary stations. In each of the frequency bands a frame with a plurality of time slots is used. This particular combination is e.g. used in GSM (Global System for Mobile Communication) and DECT (Digital Enhanced Cordless Telephone).

In large communication networks, the available channels (frequencies, time slots, codes or combinations thereof) is smaller than the number of secondary stations, making it impossible to assign fixedly a channel to a secondary station. To enable the use of the available channels by all secondary stations, a Medium Access (MAC) protocol is used. In the prior art according to the above mentioned article the secondary stations determine which channels are available for seizing in a next frame by listening to the acknowledgment messages transmitted by the primary station after correct reception of a message from a secondary station. In a next frame the secondary stations attempt to seize one of the channels which were not used in the previous frame.

A problem with the prior art access protocol is that the secondary stations need to be able to receive and decode all acknowledgment messages transmitted by the primary station. For high capacity networks the reception and processing of all acknowledge messages in each secondary station is virtually impossible due to the large number of channels to be monitored.

SUMMARY OF THE INVETION

An object of the present invention is to provide a communication network according to the preamble which is able to deal with a large number of channels.

To achieve said object the communication network according to the present invention is characterized in that the primary station is arranged for determining which channels are not used by a secondary station, in that the primary station is arranged for transmitting to the secondary stations an identification of channels which are not used by secondary stations, and in that the secondary stations are arranged for attempting to seize at least one of the channels which are not used by secondary stations.

In this way it is obtained that the secondary stations do not have to receive and process all acknowledge messages, but that it can simply determine the channels which it can try to seize in the next slot by receiving a list of free channels determined by the primary station.

It is observed that it is also conceivable that the primary station transmits to the secondary stations which channels are in use. The secondary station can derive from this information the channels which they can use for transmitting transmit request signals. The attempt to seize a channel can be done by transmitting a special transmit request signal to the primary station, but preferably a first part of the payload data is transmitted to the primary station to seize a channel. The advantage of using payload data to seize a channel is the increased efficiency.

An embodiment of the present invention is characterized in that the primary station is arranged for transmitting to the secondary stations whether a particular attempt to seize a channel was successful, and in that the secondary station having successfully seized said channel, keeps using said channel for transmitting data to the primary station.

In this embodiment of the invention, the primary station does not need to transmit information to the secondary station on which channel it should transmit its payload information. This simplifies the access protocol substantially. It is observed that the signaling to the secondary station that its attempt to seize the channel was successful can simply be done by removing/adding the particular channel from/to the list of unused/used channels, leading to a further decrease of the complexity of the access protocol.

A further embodiment of the invention is characterized in that the primary station is arranged for determining a channel again as available channel as soon the secondary station stops transmitting data over said channel.

This feature simplifies the access protocol further, because no signaling mechanism is required to inform the primary station that a secondary station does not need the channel anymore. The secondary station can simply stop using the channel and the channel will automatically assumed to be free.

A still further embodiment of the invention is characterized in that the secondary station is arranged for attempting to seize a channel with a probability p smaller than one, if a previous attempt to seize a channel was not successful.

In this way it is prevented that in case of a huge amount of attempts of seizing a channel these attempts keep colliding without any channel being seized. By reducing the probability that an attempt of seizing a channel takes place, the number of attempts of seizing a channel that will be successful can be substantially increased.

A still further embodiment of the invention is characterized in that the secondary stations are arranged for randomly selecting one of the available channels to be seized by the secondary station.

According to this embodiment it is ensured that the attempts to seize a channel is evenly distributed over the channels, leading to a maximum probability of a successful seizure of a channel for all secondary stations.

A still further embodiment of the present invention is characterized in that the secondary station is arranged for attempting to seize at least one additional channel if it receives an indication from the primary station that its previous attempt to seize a channel was successful.

This feature enables a secondary station to obtain a transmission capacity being larger than the transmission capacity of one channel. By attempting to seize a new channel after a previous attempt to seize a channel that was successful, the amounts of attempts to seize a channel is distributed in time. This increases the probability of a successful attempt of seizing a channel.

BRIEF DESCRIPTION OF THE DRAWINGS

The invention will now be explained with reference to the drawings.

DETAILED DESCRIPTION OF THE PREFERRED EMBODIMENTS

Figure 1:
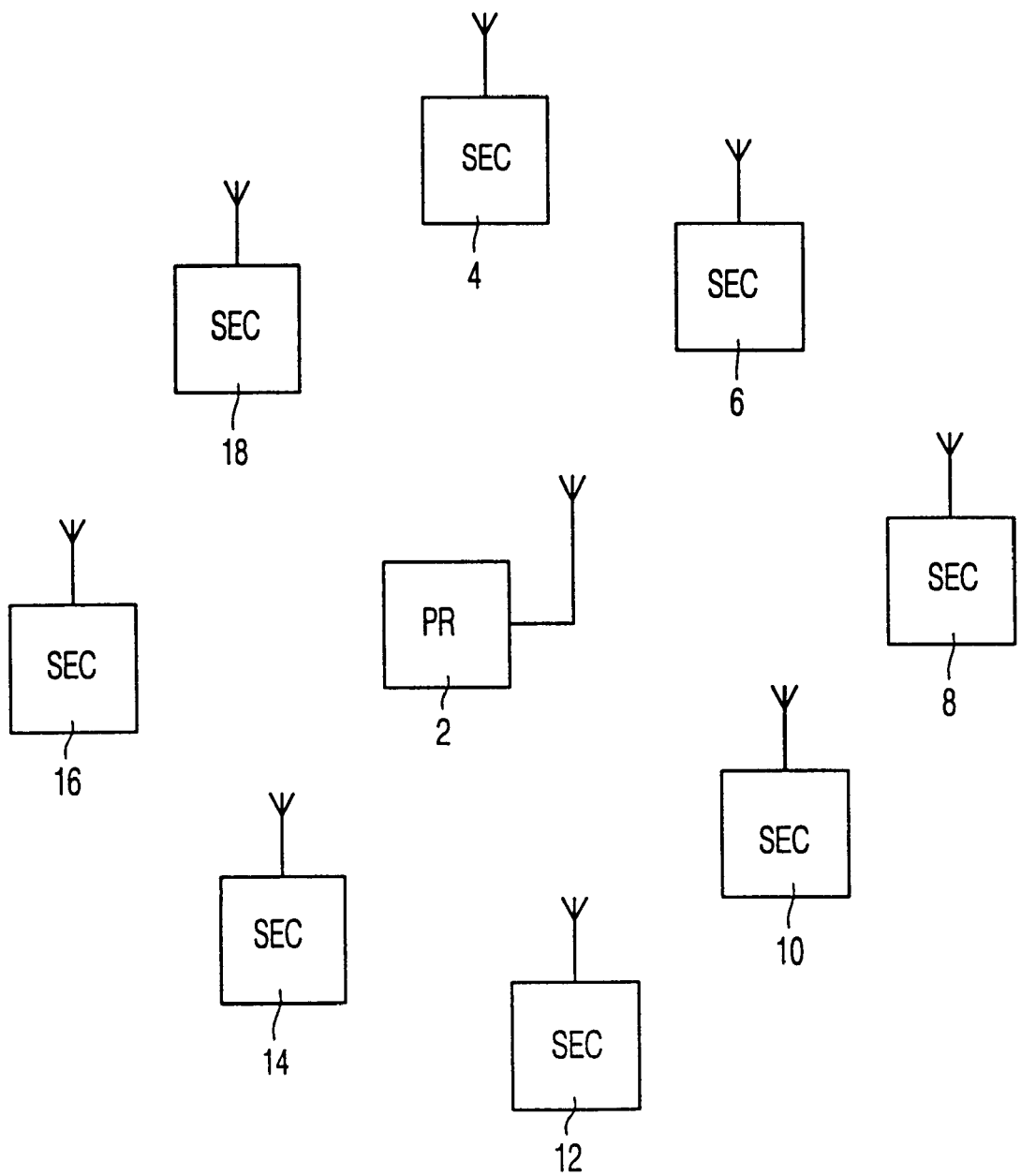
FIG. 1 shows a LMDS communication network in which the present invention can be applied.

In the LMDS Local Microwave Distribution System) communication network according to FIG. 1, a primary station 2 is surrounded by a plurality of secondary stations 4, 6, 8, 10, 12, 14, 16, and 18. The network according to FIG. 1 is arranged to operate in the 40 GHz band. The primary station 2 uses an omnidirectional antenna in order to be received by all the secondary stations 4, 6, 8, 10, 12, 14, 16, and 18. The secondary stations 4, 6, 8, 10, 12, 14, 16, and 18 generally use a directional antenna in order to receive a maximum signal level from the primary station 2.

Alternatively, it is also possible to place the primary station on the edge of the area to be served and to use a directional antenna in order to prevent that signals are transmitted outside the area to be served. This alternative reduces the signal transmitted in neighboring cells, resulting in that a given frequency can be reused at a shorter distance than in the system using an omnidirectional antenna.

Figure 2:
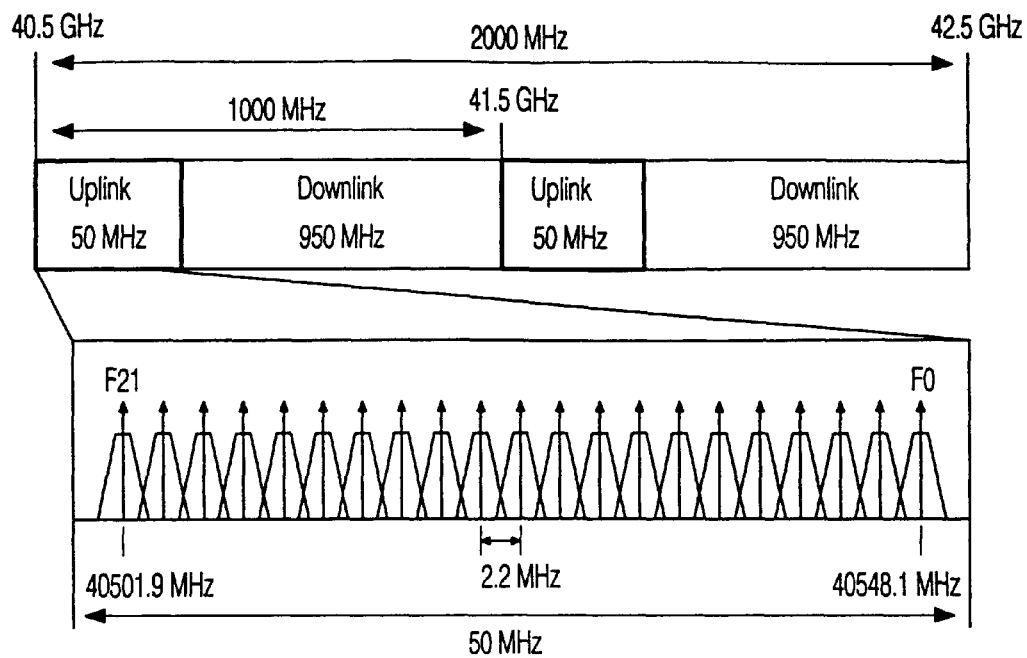
FIG. 2 shows the available frequencies for LMDS transmission in the 40 GHz band.

FIG. 2 shows the frequency bands to be used in the communication network according to the invention. The total frequency band available in Europe for LMDS systems ranges from 40.5 GHz to 42.5 GHz. This frequency band of 2 GHz is split into 2 bands of 1 GHz. Each of the 1 GHz frequency bands is split into an uplink band having a bandwidth of 50 MHz and a downlink frequency band of 950 MHz. The uplink band of 50 MHz comprises 22 carriers having a spacing of 2.2 MHz. Each of these carriers can be GMSK modulated with a bitrate of 1152 kbit/sec. This is the same channel structure as is used in the DECT cordless phone standard.

Figure 3:
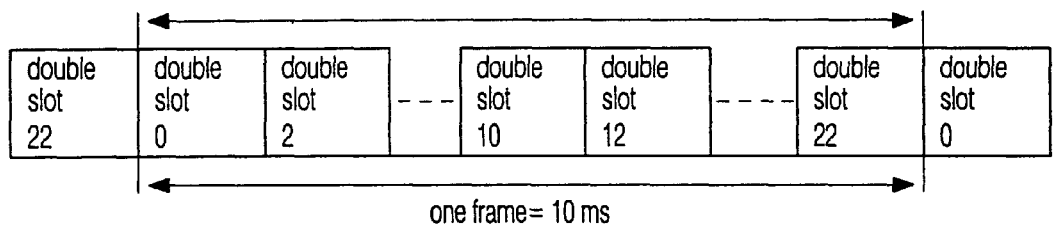
FIG. 3 shows the uplink frame to be used in the transmission system according to the invention.

FIG. 3 shows the uplink frame to be used on each of the 22 carriers according to FIG. 2. The uplink frame has a duration of 10 ms comprising 12 double slots. Each of the double slots can carry 960 bits.

Figure 4:
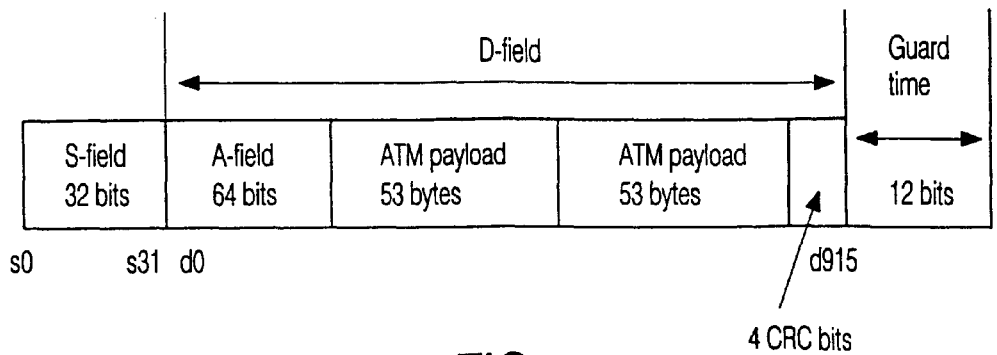
FIG. 4 shows a packet comprising two ATM-cells as is used in the present invention.

FIG. 4 shows the constitution of an uplink packet which can be transmitted in one double slot according to FIG. 3. It starts with a synchronization field S of 32 bits which is followed by a 64 A-field which is used for transmitting control information. After the 64 bit A-field follow two 53 byte ATM cells carrying payload. After the ATM cells 4 CRC bits are added. These CRC bits are used for determining whether a packet transmitted by a secondary station is received correctly. The final 12 bits of the frame are not used for transmitting data. They are used as guard space to prevent overlapping of two subsequent packets from different secondary stations due to transmission delay differences.

Figure 5:
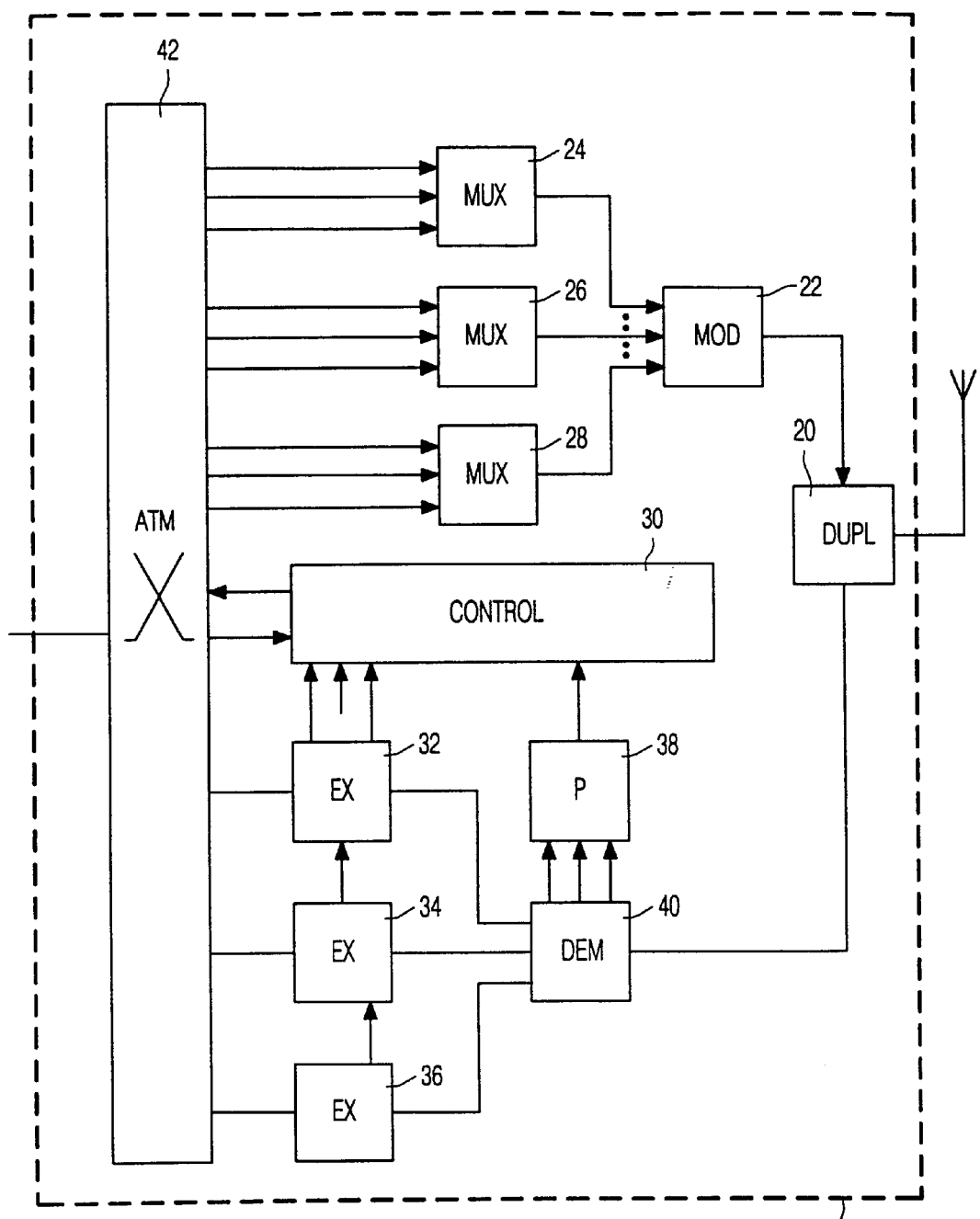
FIG. 5 shows a block diagram of a primary station according to the present invention.

In the primary station 2 according to FIG. 5, the antenna is connected to a duplex filter 20 which separates the uplink frequency band and the downlink frequency band. An output of the duplex filter 20, carrying the uplink signals is connected to an input of a demodulator 40. A plurality of outputs of the demodulator 40, each carrying a sequence of TDMA packets are connected to corresponding depacketizers 32, 34 and 36 each dealing with one of the sequences of TDMA packets.

A plurality of further outputs of the demodulator 40 provides a strength measure for each of the carriers. This strength measure can e.g. be determined by measuring the amplitude of the IF signal of each of the carriers. It is observed that this amplitude measurements should be performed quickly enough in order to distinguish between the strength of subsequent double slots. A detector 38 is arranged for determining the state of each of the uplink channels. This is done by monitoring the strength value determined for each carrier in the demodulator 40 and deciding for each time slot whether the strength measure in said time slot exceeds a given threshold value. If the threshold value is exceeded, the channel is provisionally marked as seized. Otherwise the channel is indicated to be free. This information is passed to the control means 30 which uses it to establish a list of free channels.

In each of the depacketizers 32, 34 and 36 the correctness of the received packets is checked by calculating the CRC value and comparing it with the CRC value included in the packet. If the comparison indicated that the packet is received correctly, the two ATM cells are extracted from the packet and passed to the ATM switch 42. The result of the comparison is also passed to the control means 30.

The control means are arranged for determining the free channel list for transmission to the secondary stations. The determination whether a channel should be indicated as free is determined from the output signal of the detector 38 and the CRC output of the depacketizers 32, 34 and 36 as will be explained later in more detail.

In order to deal with transmission errors in payload data, a ARQ scheme is used. Preferably the Selective Repeat scheme is used in which only packets that are received in error are retransmitted by the secondary station. The depacketizers 32, 34 and 36 comprise a buffer memory in order to present the ATM packets in order to the ATM switch. A sequence number to facilitate the reordering can be included in the A-field of the packet.

An output of the control means 30 is applied to the input of a modulator 22 in which the control information such as the free channel list and signals to acknowledge the correct reception of an upstream packet is modulated on a broadcast carrier which can be received by the secondary stations. A plurality of outputs of the ATM switch is connected to a plurality of inputs of multiplexers 24, 26 and 28 which include the ATM packets received from the ATM switch into a TDM transport stream. Each of the TDM transport streams at the outputs of the multiplexers 24, 26 and 28 is modulated on a separate carrier by the modulator. The output signal of the modulator, comprising a plurality of carriers modulated with payload ATM packets and a carrier modulated with control information, is applied to an input of the duplexer 20 for transmission to the secondary stations.

The primary station transmits information regarding the uplink over the broadcast channel in a BSCM (Base Station Control Message) This BSCM comprises three fields being the SS, RC and CC fields.

The SS field comprises two status bits. The first status bit (bit 0) indicates whether the channel is UNRESERVED (free) or RESERVED. The second status bit (bit 1) indicates whether the payload in the channel was received correctly by the primary station.

The RC field is arranged for transmitting reservation information to the secondary stations. It comprises a combination of a Terminal Identification Number TIN of a secondary station and the channel number assigned to it.

The CC field is used for transmitting network entry messages to the secondary stations. It comprises a TIN assignment message and a delay compensation value and a transmit power value.

Figure 6:
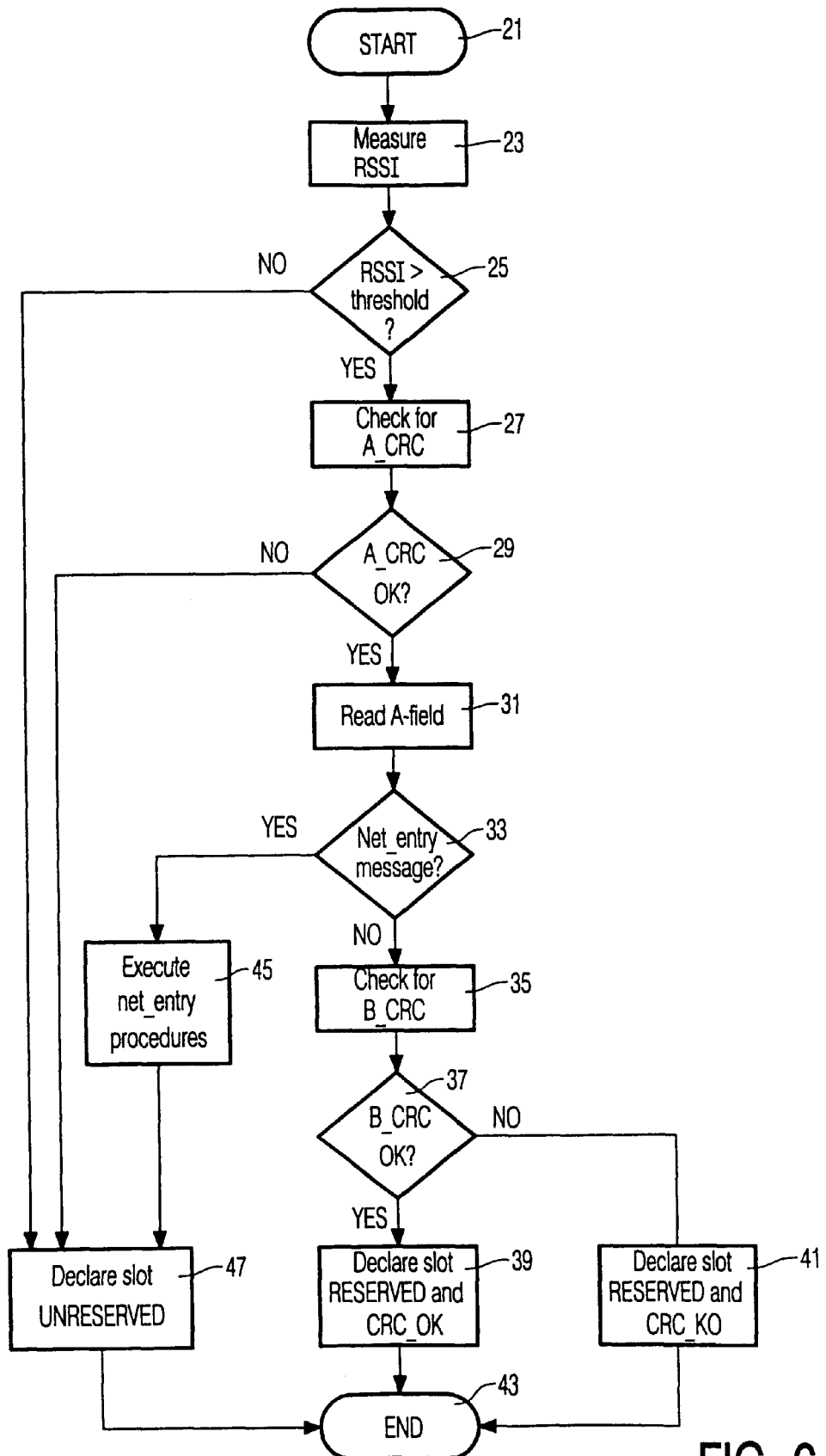
FIG. 6 shows a flow graph of a program executed by the control means 30 to implement the access protocol according to the invention.
Figure 7:
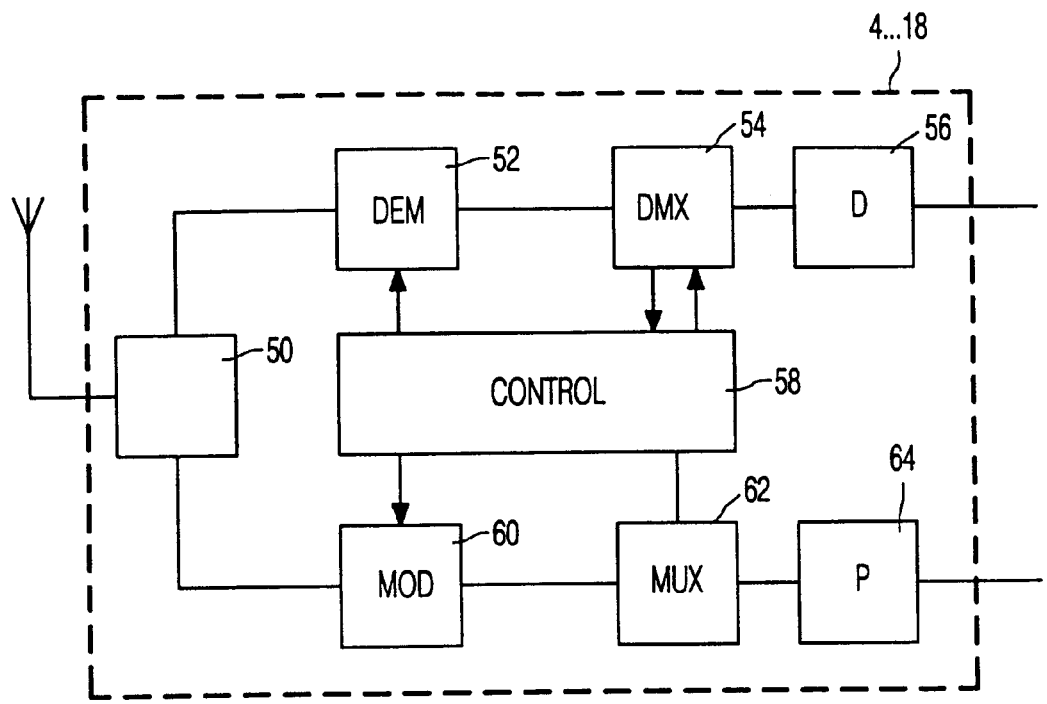
FIG. 7 shows a block diagram of a secondary station according to the present invention.

In the flow graph according to FIG. 6 the numbered instruction have the following meaning.

| Nr. | Inscription | Meaning |
| --- | --- | --- |
| 21 | START | The program is started. |
| 23 | Measure RSSI | The strength of the RF signal in the current time slot is measured. |
| 25 | RSSI > Threshold ? | The strength of the RF signal in the current time slot is compared with a threshold. |
| 27 | Check for A_CRC | A checksum for the header of a received packet is calculated. |

-continued

| Nr. | Inscription | Meaning |
| --- | --- | --- |
| 29 | A_CRC OK ? | The correctness of the checksum for the header of the received packet is checked. |
| 31 | Read A-Field | The header of the packet is read. |
| 33 | Net_entry message ? | It is checked whether the received message is a network entry message. |
| 35 | Check for B_CRC | A checksum for the payload of a received packet is calculated. |
| 37 | B_CRC OK ? | The correctness of the checksum for the payload of the received packet is checked. |
| 39 | Declare slot RESERVED and CRC_OK | The time slot is declared RESERVED and the checksum is declared correct. |
| 41 | Declare slot RESERVED and CRC_KO | The time slot is declared RESERVED and the checksum is declared incorrect. |
| 43 | STOP | The program is stopped |
| 45 | Execute net_entry procedures | The network entry procedures are executed |
| 47 | Declare slot UNRESERVED | The time slot is declared UNRESERVED |

The flow graph according to FIG. 6 shows the operations performed by a program executed by the control means 30 of the primary station.

In instruction 21 the program is started and the required variables are initialized. In instruction 23 the strength of the currently received channel (timeslot) is determined. This can be done by reading the strength value determined by the detector 38 in FIG. 5. In instruction 25 the strength value is compared with a threshold. If the strength value is not larger than the threshold value, the program is continued with instruction 47 in which the channel is signaled to be UNRESERVED (free). After instruction 47 the program is terminated in instruction 43 for the current channel.

If the strength value is larger than the threshold, in instruction 27 the checksum of the header is calculated. In instruction 29 it is checked whether the checksum of the header determined in instruction 27 is correct. If this checksum is not correct, it means that the primary station cannot determine anymore which secondary station used the channel. Consequently the program is continued with instruction 47 in which the channel is signaled to be UNRESERVED (free).

If the checksum of the header is correct, in instruction 31 the complete header is read for processing. In instruction 33 it is checked whether the current packet carries a message indicating an initial connection to the network. If this is the case, in instruction 45 the network entry procedures are executed.

The network entry procedures involve the determination of the transmission delay between the particular secondary station and the nominal strength with which the secondary station is received by the primary station. The primary station determines from the measured transmission delay and the measured strength, a delay compensation value and an output power setting for the secondary station. These values are transmitted to the secondary station, together with the Terminal Identification Number (TIN). The secondary station adapts the transmission instants and the transmission power in accordance to the delay compensation value and the power setting received from the primary station. In this way it is ensured that the signals received from the secondary stations are correctly aligned with respect to the timeslot boundaries and that the signals from the different secondary stations are received with substantially the same strength by the primary station. The terminal number has to be included by the secondary station in the header of each packet it transmits to the primary station.

If the current header does not indicate a net_entry message, in instruction 35 the checksum of the payload is determined. In instruction 37 it is checked whether the checksum determined in instruction 35 is correct. If the checksum is correct, in instruction 39 the channel is signaled as RESERVED and the correct reception of the packet is signaled. If the checksum is not correct, the channel is signaled as RESERVED, and the erroneous reception of the packet is signaled to the secondary station. Subsequently in instruction 43 the program is terminated.

The program according to FIG. 6 has to be executed for every uplink channel used in the communication network.

In the secondary station 4, 6, 8, 10, 12, 14, 16, and 18 according to FIG. 6, the antenna is coupled to an input/output of a duplexer 50. An output of the duplexer 50 is applied to a demodulator 52 which demodulates the carriers to be received by the secondary station, being the carrier modulated with the control information and one or more carriers modulated with payload data.

The signals demodulated by the demodulator 52 are passed to a demultiplexer 54 which extracts the control signals from the output signal of the demodulator 52 and passes them to the control means 58. The payload signals are passed to a depacketizer 56 which extracts the payload ATM packets from the output signal of the demultiplexer 54 and passes them to the output of the secondary station.

Signals to be transmitted by the secondary station are offered to a packetizer 64 which constructs packets comprising ATM cells offered at its input. The packetizer 64 comprises also a transmit buffer for storing ATM cells in order to prevent loss of ATM cells which have to be retransmitted due to collisions or transmission errors. The constitution of the packets to be transmitted to the primary station is in accordance to FIG. 4. If ATM cells are offered to the packetizer 64, this is signaled to the control means 58. The control means 58 uses the free channel list, which can be derived from the channel status bits received from the primary station, to select a free channel to transmit the packet. The selection of the channel to be used can be done in different ways.

A first way of selecting the free channel is to use the first free channel encountered on the channel list. The advantage of this is an easy implementation. A disadvantage of choosing the first free channel is the increased likelihood of collisions if all secondary stations select the channel to be used in this way. A second way of selecting the free channel to be used is to select the free channel according to a probability function. It is possible to use a uniform probability function in which each channel on the free channel list is chosen with an equal probability. It is also possible to choose the channel to be used with a probability that decreases as function of the order of the free channel. E.g. the first free channel is selected with a probability of 0.5, the second free channel is selected with a probability of 0.25 and the third free channel is selected with a probability of 0.125 etc. This can be done by invoking a random generator which generates a number between 0 and 1. If the random number is larger than 0.5, the first free channel is used. If the random number is smaller or equal to 0.5, the random generator is invoked again, and the second channel is selected if the random value is larger than 0.5. This process is repeated until a free channel is selected or the end of the free channel list is reached.

After the free channel to be used is selected, the packet assembled by the packetizer 64 is transmitted in the free channel selected.

If the first packet of a burst is received correctly by the primary station, the channel in which it is transmitted is regarded as seized by the secondary station and is indicated as RESERVED. The secondary station that has transmitted a packet in said channel can keep using said channel for transmitting packets to the primary station. If a secondary station needs more channels, it can start attempting to seize additional channels in the same way as described above, until a given maximum number of channels is seized by a particular secondary station.

If the first packet of the burst is not received correctly by the primary station, the channel is indicated as UNRESERVED. The secondary station should make a new attempt to seize a channel in the next uplink frame. In order to prevent repeating collision the secondary stations will attempt to seize a channel in a given frame with a probability p.

The multiplexer 62 is arranged for selecting the timeslot corresponding to the selected free channel. The modulator 60 modulates the output signal of the multiplexer 62 on a carrier having a frequency corresponding to the carrier frequency of the selected free channel. The output signal of the modulator 60 is applied to an input of the duplexer 50 for transmission to the primary station.

Figure 8:
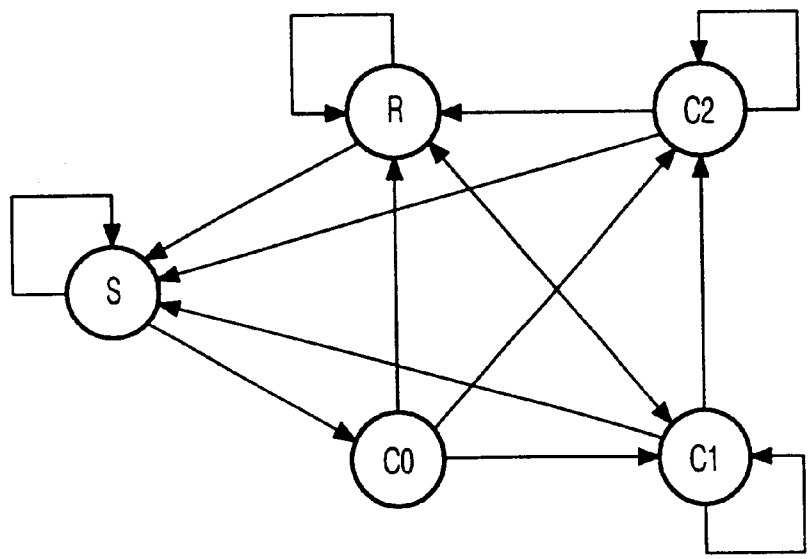
FIG. 8 shows a state diagram of a state machine used in the secondary station according to FIG. 6.

According to the state diagram shown in FIG. 8, the secondary station can be in one of five possible states. The first state indicated with S is the Silent State. In this state the secondary station reads the information received from the primary station and constructs from this information a list of channels being UNRESERVED (free channel list). The secondary station remains in this state until ATM cells are offered to its input for transmission. The ATM cells at the input are included into packets having a format according to FIG. 4. A Packet Identifier Number (PIN) is introduced in the A-field of the packet in order to be able to reconstruct the correct order of the packets in the primary station.

When a secondary station is ready to transmit packets, it enters the second state $C_0$. This change to state $C_0$ can happen a-synchronously during the frame. In this state $C_0$ the secondary station attempts to seize the number OBJ_NUM of channels it needs for transmitting the ATM cells with the desired QoS (Qouality of Service). This is done by transmitting OBJ_NUM packets in the next UNRESERVED channels still available in the current frame. If the number of available UNRESERVED channels in the present frame is less than OBJ_NUM the secondary station attempts to seize all available UNRESERVED channels.

Because the change from state S to state $C_0$ is a-synchronous from the frame timing, these attempts of different secondary stations are uniformly distributed over the frame. At the beginning of the next frame, the secondary station can determine whether the attempts to seize one or more channels was successful from the signals that are broadcast by the primary station. An attempt can be regarded as successful if the channel is indicated as RESERVED in the channel status bits and if the primary station indicated in the CC field of the BSCM that the particular channel was reserved for the secondary station having issued the attempt to seize the channel.

If all OBJ_NUMBER of channels have been reserved for the secondary station it changes from state $C_0$ to state R, indicating that all required channels are reserved for said station. The reserved channels can be used by the secondary station for transmitting payload data.

If the number of free channels in the part of the frame still left was less than OBJ_NUMBER, and if all channels which the secondary station tried to seize are reserved for said station the secondary station changes from state $C_0$ to state $C_1$.

In the cases that attempts of the secondary station to seize one or more channels were unsuccessful due to collisions or interference, the secondary station changes from state $C_0$ to state $C_2$.

The secondary station is in state 1 if additional channels have to be reserved in order to achieve OBJ_NUMBER reserved channels. In state $C_1$, the secondary station selects randomly the remaining number of channels it needs to achieve reservation of OBJ_NUMBER channels from the free channel list. This selection is done such that the likelihood of selection of each channel on the free channel list is equal. The packets of which correct reception is signaled by the primary station in the next BSMC can be removed from the transmit buffer of the secondary station. If the slot is still indicated as reserved for the secondary station, but it is signaled that the packet is not received correctly, the packet has to be transmitted again. If a packet sent in a channel is received in error by the primary station such that the source of the packet cannot be determined, the channel is indicated to be free in the next BSCM. The secondary station looses the reservation of said channel. The packet transmitted should be remain in the transmit buffer for later transmission.

If one of the channels the secondary station attempted to seized is not reserved for said station, due to collisions or interference, the secondary station changes from state $C_1$ into state $C_2$.

In state $C_2$, the secondary station waits for a random number of frames without attempting to seize any channel. It keeps using the channels it has already seized. The average numbers of frames is determined by a parameter p as is explained earlier. After waiting during a number of frames in state $C_2$, the secondary station changes to state $C_1$, in order to attempt to seize the remaining channels it needs.

A secondary station enters the state R if the number of reserved channels is equal to the value of OBJ_NUMBER. It remains in state R until all packets in the transmit buffer have been transmitted or until any of the reserved channels is lost due to transmission errors in the header. If all packets have been transmitted, the secondary station enters the state S. If a reserved channel is lost due to transmission errors in the header, the secondary station enters state $C_1$, in order to seize a new channel to replace the channel of which the reservation was lost.

It is observed that also during the states $C_0$, $C_1$ and $C_2$ it can happen that all ATM cells in the transmit buffer have been transmitted. In such a case the secondary station enters state S until new ATM cells are to the packetizer 64.

What is claimed is:

1. A communication network comprising a primary station coupled to a plurality of secondary stations via a transmission medium, the secondary stations being arranged for attempting to seize a channel for transmitting information to the primary station, wherein the primary station is arranged for determining which channels are not used by a secondary station, in that the primary station is arranged for transmitting to the secondary stations an identification of channels which are not used by
secondary stations, and in that the secondary stations are arranged for attempting to seize at least one of the channels which are not used by secondary stations by transmitting at least a portion of payload data to the primary station, wherein a secondary station selects at least one channel for seizure from the identification of channels for according to a predetermined selection criteria;

wherein the predetermined selection criteria comprises using a probability function with a first probability p being between 0 and 1, if an initial attempt to seize a channel was not successful;

and wherein once said secondary station successfully seizes at least one channel, the primary station is not required to signal other secondary stations that an attempt to seize at least one of the channels was successful, and wherein the primary station removes the seized at least one channel from the identification of channels which are not used.

2. The communication network according to claim 1, wherein the primary station is arranged for transmitting to the secondary stations whether a particular attempt to seize a channel was successful by updating the identification of channels, and in that the secondary station having successfully seized said channel, keeps using said channel for transmitting data to the primary station.

3. The communication network according to claim 2, wherein the primary station is arranged for determining a channel again as available channel as soon as the secondary station stops transmitting data over said channel.

4. The communication network according to claim 2, wherein the secondary station is arranged for attempting to seize at least one additional channel if it receives an indication from the primary station that its previous attempt to seize a channel was successful.

5. The communication network according to claim 1, wherein the predetermined selection criteria comprises arranging the secondary stations for randomly selecting one of the available channels to be seized by the secondary station after a first channel on the identification of channels is selected.

6. A secondary station being arranged for attempting to seize a channel for transmitting information to a primary station, wherein the secondary station is arranged for receiving channels that are not used by any other secondary stations, and in that the secondary station is arranged for attempting to seize at least one of the channels which are not used by any other secondary stations by transmitting at least a portion of payload data to the primary station, wherein the secondary station selects at least one channel for seizure according to a predetermined selection criteria including one of a probability function, a random distribution function, and an even distribution function;

and wherein once a secondary station seizes at least one channel, the primary station is not required to signal the secondary station that an attempt to seize at least one of the channels was successful, and wherein the primary station removes the seized at least one channel from the identification of channels which are not used.

7. The secondary station according to claim 6, wherein the secondary station is arranged for receiving information indicating whether a particular attempt to seize a channel was successful, and in that the secondary station having successfully seized said channel, starts using said channel for transmitting data to the primary station.

8. A primary station for use in a multiple access communication network, said primary station being arranged for detecting attempts of secondary stations to seize a channel according to a probability function wherein probability function with a first probability p being between 0 and 1, if an initial attempt to seize a channel was not successful by transmitting payload information to the primary station, wherein the primary station is arranged for determining which channels are not used by a secondary station, and in that the primary station is arranged for transmitting an identification list to all of the secondary stations identifying the channels which are not in use.

9. The primary station according to claim 8, wherein the primary station is arranged for determining a channel again as available channel as soon as the secondary station having seized said channel stops transmitting data over said channel.

10. A communication method using a primary station coupled to a plurality of secondary stations via a transmission medium, the method comprising attempting to seize a channel by transmitting payload information to the primary station, wherein the method comprises determining which channels are not used by a secondary station, transmitting to the secondary stations the channels which are not used by secondary stations, and in that the method comprises attempting to seize at least one of the channels which are not used by secondary stations according to a probability function wherein probability function with a first probability p being between 0 and 1, if an initial attempt to seize a channel was not successful.

* * * * *